US011744360B1

(12) United States Patent
Mirth et al.

(10) Patent No.: US 11,744,360 B1
(45) Date of Patent: Sep. 5, 2023

(54) TABLE WITH CABLE PASSAGEWAYS (71) Applicant: Artifox, LLC, St. Louis, MO (US)

(72) Inventors: Sarah Elizabeth-Carpenter Mirth, St. Louis, MO (US); Daniel Joseph Mirth, St. Louis, MO (US)

(73) Assignee: Artifox, LLC, St. Louis, MO (US)

( * ) Notice: Subject to any disclaimer, the term of this patent is extended or adjusted under 35 U.S.C. 154(b) by 108 days.

(21) Appl. No.: 17/239,955

(22) Filed: Apr. 26, 2021

Related U.S. Application Data

(63) Continuation-in-part of application No. 16/702,242, filed on Dec. 3, 2019, now Pat. No. 11,408,596, which is a continuation-in-part of application No. 15/687,198, filed on Aug. 25, 2017, now Pat. No. 10,492,601.

(60) Provisional application No. 63/017,276, filed on Apr. 29, 2020, provisional application No. 62/382,058, filed on Aug. 31, 2016.

(51) Int. Cl.
*A47B 21/06* (2006.01)
*A47B 83/04* (2006.01)
(Continued)

(52) U.S. Cl.
CPC ............ *A47B 21/06* (2013.01); *A47B 83/045* (2013.01); *A47B 88/40* (2017.01); *H02J 7/0042* (2013.01)

(58) Field of Classification Search
CPC ....... A47B 21/06; A47B 83/045; A47B 88/40; H02J 7/0042
See application file for complete search history.

(56) References Cited

U.S. PATENT DOCUMENTS 1,780,353 A * 11/1930 Mary .................... A47B 83/045
312/351
4,792,881 A * 12/1988 Wilson .................... A47B 21/06
439/131
(Continued)

FOREIGN PATENT DOCUMENTS

CN 205432678 U * 8/2016 ............. A47B 17/03
DE 202008000900 U1 * 4/2008 ............. A47B 21/06
(Continued)

OTHER PUBLICATIONS

SlatePra TechDesk [online], iSkelter. Retrieved from the Internet on Jul. 18, 2017 <URL:http://iskelter.com/product/slatepro-tech-desk/>.
(Continued)

*Primary Examiner* — Hanh V Tran
(74) *Attorney, Agent, or Firm* — CreatiVenture Law, LLC; Dennis J M Donahue, III; Kevin Staed (57) ABSTRACT

A table has a shelf beneath a tabletop which holds charging strips, communication hubs, cords and/or other equipment in a storage compartment behind a divider wall. The divider wall has an opening forming a passageway for cords from the equipment that are used to power and/or communicate with electronic devices on the tabletop or in a cubby on the shelf ahead of the divider wall. The table also has a groove in the tabletop for holding electronic devices. The groove has one or more apertures through which cords pass from the equipment in the storage compartment to the electronic devices in the groove for providing power and/or communication. The table can be a desk, conference table, side table, end table, night stand, and any other piece furniture that has the tabletop and shelf with a divider wall and opening according to the present invention, such as wall shelves.

20 Claims, 4 Drawing Sheets

(51) Int. Cl.
*A47B 88/40* (2017.01)
*H02J 7/00* (2006.01)

(56) References Cited

U.S. PATENT DOCUMENTS

| | | | |
|---|---|---|---|
| 4,948,205 A | 8/1990 | Kelley | |
| 5,651,594 A | 7/1997 | Lechman | |
| 6,022,087 A * | 2/2000 | Gilbert | A47B 88/80 |
| | | | 361/679.01 |
| 6,202,567 B1 | 3/2001 | Funk et al. | |
| 7,677,182 B2 * | 3/2010 | Mueller | A47B 21/0314 |
| | | | 108/50.01 |
| 9,124,308 B2 | 9/2015 | Metcalf | |
| 9,516,945 B2 * | 12/2016 | Johnson | A47B 21/06 |
| 9,516,946 B1 * | 12/2016 | Edwards | A47B 83/045 |
| 10,021,976 B1 * | 7/2018 | Allen | A47B 81/06 |
| 10,782,824 B2 * | 9/2020 | Nagano | G06F 3/0416 |
| 10,791,826 B2 * | 10/2020 | Crowe | A47B 9/16 |
| 2008/0224582 A1* | 9/2008 | Boland | A47B 21/06 |
| | | | 312/330.1 |
| 2015/0173505 A1* | 6/2015 | Mirth | A47B 17/00 |
| | | | 211/186 |
| 2016/0360879 A1* | 12/2016 | Kelley | A47B 21/06 |
| 2017/0042323 A1* | 2/2017 | Johnson | A47F 7/02 |
| 2017/0135490 A1* | 5/2017 | Andrix | A47C 31/008 |
| 2017/0143113 A1* | 5/2017 | Park | A47B 13/00 |
| 2017/0164731 A1* | 6/2017 | Kemnitzer | A47B 87/002 |

FOREIGN PATENT DOCUMENTS

| | | | |
|---|---|---|---|
| EP | 0236809 A2 * | 9/1987 | |
| KR | 20100006215 U * | 6/2010 | |

OTHER PUBLICATIONS

Artifox desk [online], Artifox Retrieved from the Internet on Jul. 18, 2017 <https://web.archive.org/web/20140506011538/http://www.theartifox.com/#intro>.

* cited by examiner

TABLE WITH CABLE PASSAGEWAYS

CROSS-REFERENCE TO RELATED APPLICATIONS

This application claims priority from U.S. Provisional Patent Application No. 63/017,276 filed on Apr. 29, 2020 and is a continuation-in-part of U.S. patent application Ser. No. 16/702,242 filed on Dec. 3, 2019 which is a continuation-in-part of U.S. patent application Ser. No. 15/687,198 filed on Aug. 25, 2017 and issued as U.S. Pat. No. 10,492,601 on Dec. 3, 2019 which claims priority from U.S. Provisional Patent Application No. 62/382,058 filed on Aug. 31, 2016, all of which are herein incorporated in their entireties.

STATEMENT REGARDING FEDERALLY SPONSORED RESEARCH

Not Applicable.

APPENDIX

Not Applicable.

BACKGROUND OF THE INVENTION

Field of the Invention

The present invention relates to a side table, more particularly to a side table with a tech products and wire organization system.

Related Art

Side tables, desks and various other types of tabletops in the prior art typically have holes within a tabletop through which cables can be passed and plugged into power sources or other ports, such as wired communication ports, below the table or desk or in a wall outlet adjacent to the table or desk. These currently known tabletops generally disclose one or more holes located at particular positions on the table's top surface that can be covered when they are not being used. Typically, these holes are arranged towards the back corners or edge of side tables or towards the center of large conference tables to avoid interrupting the main working surface of the tabletop. There may also be a hole in a back panel of the desk or table which allows one or more cords or cables to pass from the wall outlet through the hole and into the space below the desktop or tabletop. These known wire control systems limit where the wires can be routed because of the limited number of holes on the work surface. Further, most of these holes do not act as a support or anchoring structure for tech accessories like phones and tablets and instead only provide limited routing means for the tech accessories' wires. Additionally, the covers for most of these holes project above the top surface of the tabletop and can actually interfere with the use of the tabletop and may reduce the flat working surface of the tabletop.

When in use, wires pass through the holes and are generally run into a cable collection area or are further routed in "wire channels" to a power source or other electronic port. In many cases, wire channels route wires down the legs of the desk or table. Some desks do not route cables to external power sources or similar electronic ports but instead provide a "technology trough" below the tabletop's working surface to provide readily accessible power without the need for long and/or exposed wiring. However, the tables that provide more direct access to power sources or other electronic ports typically suggest a permanent attachment of the electronic port within the technology trough. Since the ports are permanently attached, a user cannot quickly attach their power source or charger to these technology troughs and then remove it sometime later. Additionally, the technology troughs are typically designed for electronic ports and power sources of a specific type. Therefore, a user is again limited in how they may use these table systems as they are not universally designed to accept any type of power source or charger in the technology trough.

Power troughs in the prior art are also limited where they are designed to facilitate cable passage from the tabletop surface to an outlet situated within the trough or to a wall outlet proximate to the table itself. Accordingly, the trough can only provide passage and power to electronic devices that are situated on the top side of the tabletop surface. Given this short-coming in the prior art, there is a desire to those having skill in the art to provide an improved table design that not only facilitates cable passage to the topside of the tabletop but also to storage compartments beneath the tabletop, such as to shelves or drawers within a side table unit or to a desk drawer situated beneath the tabletop.

Another aspect of many prior art tables is the inability for a user to customize where multiple accessories are placed on their work top based on their particular needs. For example, in prior art desks, such as with the iSkelter SlatePro Tech Desk and the Artifox 1.0 desk, the wire holes and corresponding grooves are prearranged for particular size electronic devices and table accessories, and the accessory organization ledges correspond to the locations of the wire holes. These prior art designs presuppose where a user wants their accessories placed on their work station and fail to provide a user with the ability to customize their work station to best fit their individual needs as the position of devices is limited to the location of the wire holes and corresponding organization ledges. Therefore, it is another object of the present invention to provide an accessory and wire organization system that allows a user to position accessories about their work station as they see fit as well as hold multiple devices. In addition, the present invention enables easy wire pass through regardless of the user's preferred accessory arrangement.

The invention disclosed in U.S. Pat. No. 10,492,601, which is a parent to this application, discloses an improved wire organization system which has a cable grid positioned towards the back of the table and situated below the apertures that extend through the tabletop. The '601 Patent suggests that chargers, power strips, or other accessories can be fastened to the cable grid through an array of apertures without being limited by a particular size or position of a technology trough as in the prior art. Although the cable grid is an improvement over the prior art, it requires a fasteners to hold the chargers, power strips, and other accessories to its surface which has a substantially vertical orientation. Additionally, even if the chargers, power strips, and other accessories are fastened to the back face of the cable grid, they remain visible from the front of the desk or table due to the grid's aperture array.

Accordingly, it would be beneficial to provide an improved wire organization system which allows chargers, power strips, power supplies, and other electronic accessories to be held beneath the tabletop towards the back of the table and is not only free from the limitations of technology troughs in the prior art but is also free from any need for fasteners to hold the electronic power devices in place. It would be also be beneficial to provide a clean appearance to the table or desk by hiding the electronic power devices towards the back of the table and below the tabletop where they can be easily reached.

SUMMARY OF THE INVENTION

In one aspect of the invention, a table has a tabletop with a shelf that is underneath the tabletop, and the shelf has a divider wall which allows electronic equipment to be held on the shelf while being hidden from view at the front of the table. The divider wall has an opening which provides a passageway for cables from the electronic equipment to connect with electronic devices in the cubby on the shelf in front of the divider wall.

In another aspect of the invention, the tabletop has one or more grooves for holding electronic devices. There are also apertures in the groove which extend through the tabletop, from the top surface to the bottom surface, and which provide additional passageways for cables from the electronic equipment to connect with the electronic devices that either sit on the tabletop or are held by the groove.

In particular aspects of the inventive table described herein, the divider wall is located back from the central longitudinal axis of the tabletop and is ahead of the back edge of the tabletop by a distance that is equal to or greater than one half the height of the divider wall, and the opening in the divider wall is an elongated slot located in the bottom edge of the divider wall adjacent to the upper surface of the shelf.

In a general aspect of the invention, the inventive aspects for the table can be applied to any type of furniture that has a tabletop, including desks, conference tables, side tables, end tables, night stands, and wall shelves.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figures 1A, 1B:
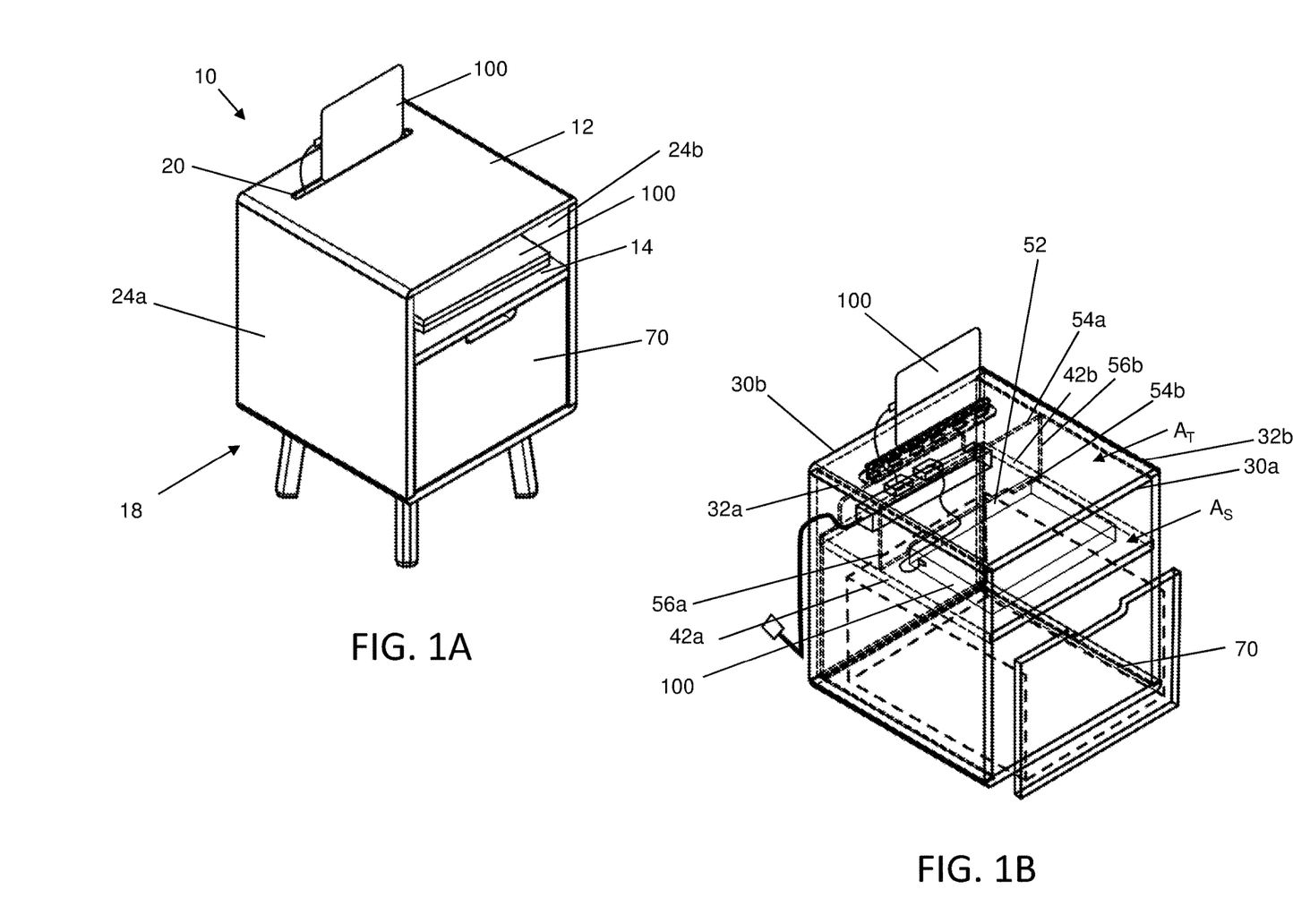
FIGS. 1A and 1B show perspective views of a side table according to the invention described herein.

As generally shown in FIGS. 1A and 1B, a table for holding and storing electronic devices, accessories, and other equipment has a groove on the top side of the tabletop with one or more apertures that extend through to the bottom side of the tabletop which allows power cords, communication wires, and other cables to extend through the tabletop from the top of the table to electronic power devices and communication hubs on a shelf beneath the tabletop and/or to wall outlets near the table. The tabletop 12 has a top surface 28a and a bottom surface 28b with a front edge 30a, back edge 30b, and a pair of side edges 32a and 32b which define the tabletop's area ($A_T$). The distance between the front edge and back edge defines the depth of the tabletop ($D_T$), and the distance between the pair of side edges defines the width of the tabletop ($W_T$). The groove 20 spans a portion of the tabletop's width that allows multiple electronic devices, such as tablet computers and smart-phones, and other accessories, such as lights and stands, to be held and/or anchored therein. The groove preferably has a series of apertures 22 which allows the cables 105 to power the electronic devices and equipment 100 when they are held within the groove or to extend to electronic devices and equipment sitting on the tabletop. The groove extends between the side edges of the tabletop and is preferably disposed on both sides of a central lateral axis 34 that is located equidistant between the tabletop's side edges and extends between the front edge and the back edge, and in some embodiments the groove is reflected about this lateral axis. The spacing of the apertures throughout the groove provides for a variation of mounting locations through which cables can pass through or to which one or more mounting brackets can be secured so the groove in the table can hold multiple accessories and electronic devices at different locations and arrangements, thus having no presupposed configuration for where the electronic devices or accessories should be supported or anchored within the groove.

Figure 7A:
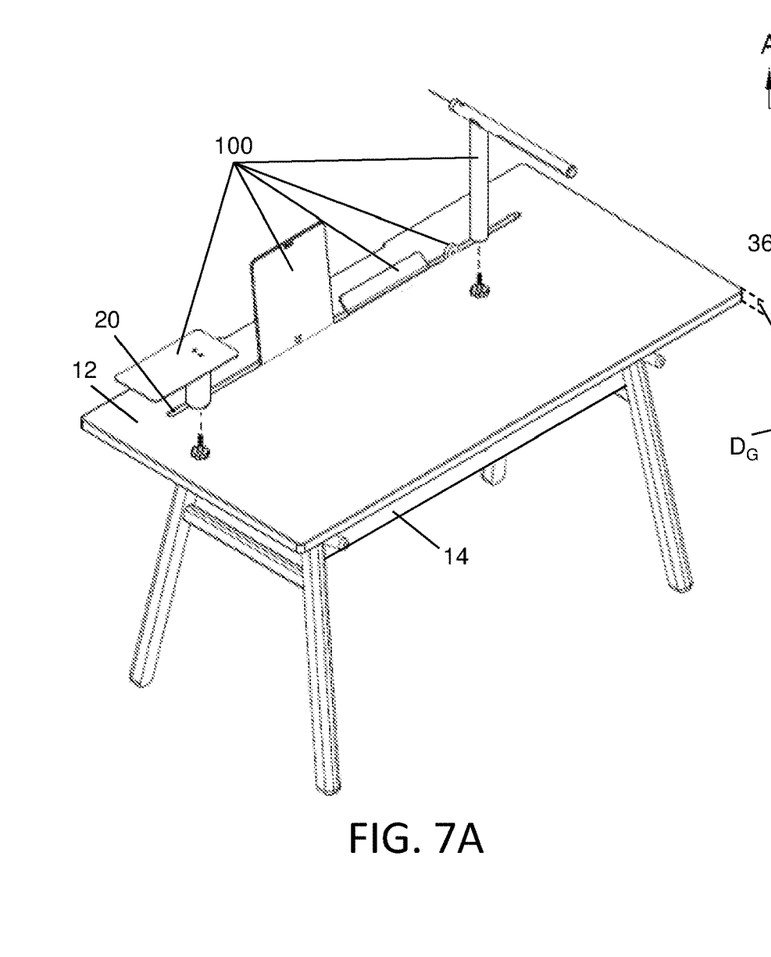
FIGS. 7A and 7B respectively show the desk shown in FIGS. 4A and 4B with electronic devices in the groove and detail views of the groove in the tabletop.
Figure 7B:
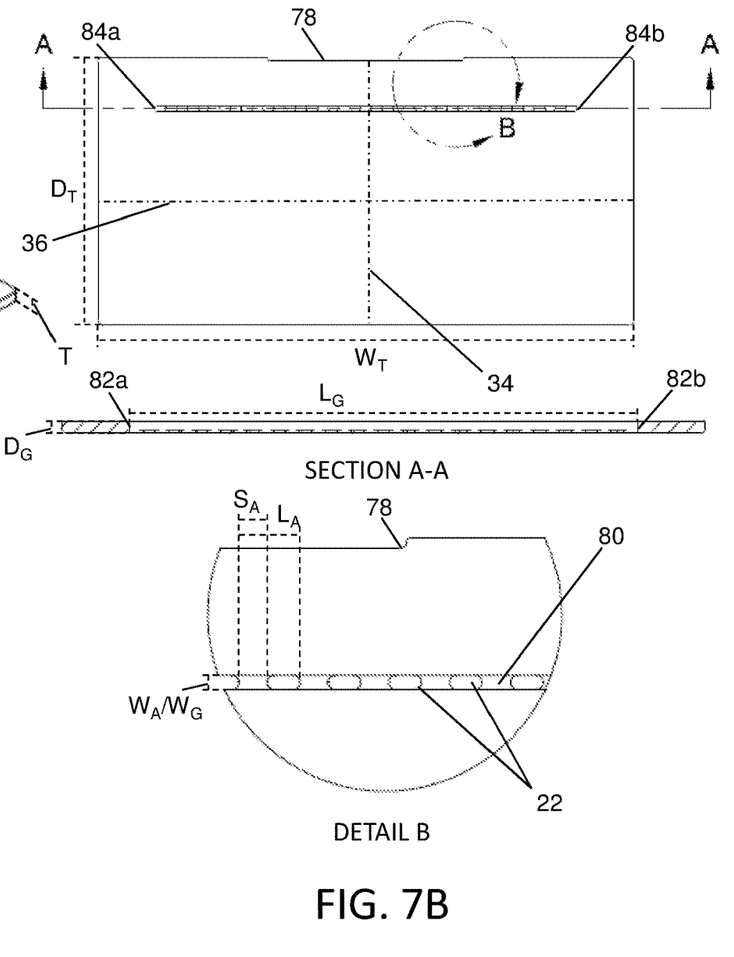

As particularly shown in FIG. 7B, the groove is recessed from the top surface of the tabletop by a recessed depth ($D_G$) which may be less than the thickness (T) of the table in which case the apertures are cut through a bottom trough 80 of the groove. In other embodiments, the recessed depth of the groove can be cut through the entire thickness of the tabletop to form a slot, and a bracket with apertures is preferably mounted to the bottom of the tabletop on each side of the slot so that the apertures are aligned with the slot. It will be appreciated that the tabletop can also have other grooves with apertures and slots, such as disclosed in U.S. Pat. No. 9,095,209 which is hereby incorporated by reference herein. As in the '209 Patent, one or more apertures in the groove may be larger than the width of the groove. Regardless of whether the groove extends entirely through the tabletop or has the bottom trough, the groove has a pair of sidewalls 82a and 82b that are spaced from each other by the width of the groove ($W_G$) and that extend a groove length ($L_G$) between a pair of groove ends 84a and 84b, and the groove can hold the electronic devices, accessories, and other equipment. Cables extend from the power equipment on the shelf situated beneath the tabletop and/or wall outlets through the apertures to power the equipment either held in the groove or sitting on the tabletop. Although wired communications are increasingly being replaced by wireless communications, as indicated above, the apertures also allow communication wires to extend from a communication hub on the shelf below the tabletop or to a communications wall outlet to the electronic devices.

In each one of the embodiments of the invention and as shown in FIGS. 1-7, the shelf 14 is parallel to and situated beneath the tabletop, being separated a distance (D), and includes an upper surface 38a and a lower surface 38b with a front end 40a, back end 40b, and a pair of side ends 42a and 42b. Accordingly, the shelf forms a storage compartment 46 that is located immediately below the tabletop and which can hold electrical power devices and/or communication hubs. The storage compartment has a forward wall that is located towards the back of the table at a location between the tabletop's back edge and the tabletop's central longitudinal axis 36 which is equidistant between the front edge and back edge of the tabletop and extends between the side edges. The shelf's back end is aligned with the tabletop's back edge, and the front end of the shelf can be aligned with the storage compartment's forward wall or it can extend ahead of the forward wall towards the tabletop's front edge in which case the forward wall of the storage compartment serves as the back wall of a cubby 48 that is accessed from the front side of the table. Accordingly, the perimeter of the shelf can be coextensive with or smaller than the tabletop's perimeter so the shelf's area ($A_S$) is equal to or less than the tabletop's area ($A_S \leq A_T$).

Regardless of whether the shelf extends ahead of the wall to form the cubby or is only located in the back portion of the table to form the storage compartment, the storage compartment's forward wall is a divider wall 16 that has at least one hole, slot, or other opening 52 which allows cords, wires, and any other cables to extend through and ahead of the storage compartment's divider wall towards the front side of the table. Accordingly, the user can access equipment and cables in the storage compartment from the back side of the table, extend cables through the opening in the divider wall, and access the cables and electronic devices in the cubby from the front side of the table. For example, FIG. 1B shows a power strip 110 housed within the storage compartment proximate to the back edge of the shelf, a laptop computer housed in the cubby, and a tablet computer held up by the groove in the tabletop. There are multiple power supplies plugged into the power strip in the storage compartment, and a power cord from one of the power supplies extends through one of the apertures in the groove, and a connector at the end of the power cord plugs into a receptacle in the tablet computer. Similarly, a power cord from the other power supply extends through the opening in the divider wall, and a connector at the end of the power cord plugs into a receptacle in the laptop computer. It will also be appreciated that the power cord could be connected to an inductive power supply that is either mounted to the table or is situated on the shelf to allow for inductive charging and/or powering of electronic equipment.

The divider wall has a vertical orientation with a top end 54a proximate to and preferably in contact with the bottom surface of the tabletop and a bottom end 54b proximate to and preferably at least partially in contact with the upper surface of the shelf so the height of the divider wall ($H_D$) vertically spans essentially the entire distance (D) between the shelf the tabletop ($H_D \approx D$). The longitudinal axis of the divider wall 50 is substantially parallel with the tabletop's central longitudinal axis, and as indicated above, the divider wall is positioned between the tabletop's central longitudinal axis and tabletop's back edge and is preferably spaced forward from the back end of the shelf by a distance (d) that is at least one half the height of the divider wall ($d \geq \frac{1}{2}*H$). Accordingly, the divider wall horizontally spans the width of the table to a pair of side sections 56a and 56b that are proximate to the opposing side ends of the shelf and the side edges of the tabletop and are preferably in contact with a pair of side panels 24a and 24b that extend between the shelf and the tabletop. Accordingly, the divider wall has a width ($W_D$) which horizontally spans essentially the entire width of the tabletop ($W_D \approx W_T$).

The opening's area ($A_O$) in the divider wall is only a small fraction of the divider wall's area ($A_D$), being less than one-fifth the size ($A_O < \frac{1}{5}*A_D$). Accordingly, the divider wall substantially blocks from view through the cubby at the front of the table the cables and/or equipment that are held in the storage compartment. A particular shape and location of the opening is described below, but it will be appreciated that the location and shape of the opening are not limited; accordingly, the opening can be located anywhere in the divider wall and can be any shape. For example, according to the embodiments shown in FIGS. 1B, 2B, 3A-3D, 4A, 4B and 6, the opening is provided adjacent to the shelf along the bottom edge of the divider wall in its middle section. In alternative embodiments (not shown), the opening could be positioned along the top edge of the divider wall or at either side edge of the divider wall or within an interior portion of the divider wall away from all of the edges. When the opening is positioned in the interior portion of the divider wall, the shape preferably has rounded sides and/or corners, such as with circular openings, elliptical openings, and/or rectangular or other polygonal openings with rounded corners. It will also be appreciated that the opening can span the entire width or height of the divider wall along any of the edges or within the interior of the divider wall. Further, it is known to include a grommet or bumper around the edges of cable passageways in desks to protect the cables from fraying against hard, sharp edges.

Figure 4A:
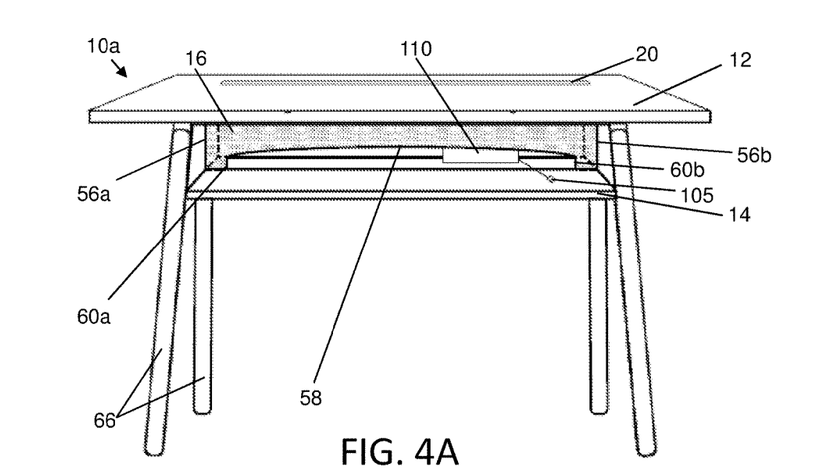
FIGS. 4A and 4B show a desk table according to the invention described herein.
Figure 6:
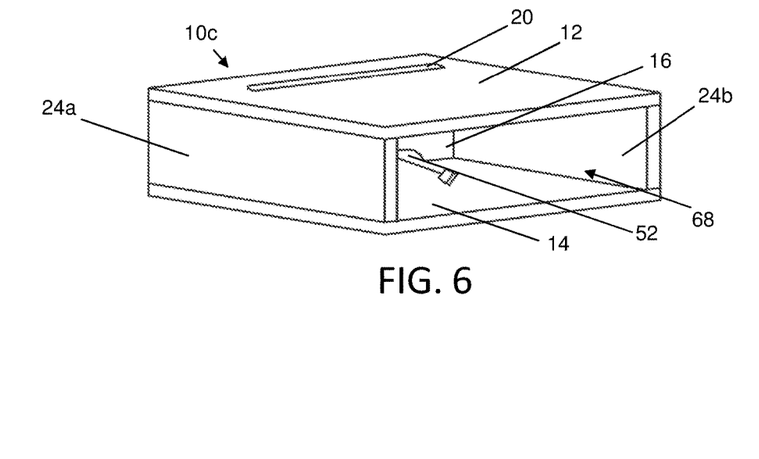
FIG. 6 shows a hanging shelf according to the invention described herein.

The openings shown in the drawings are in the form of an elongated slot with a top edge 58 spaced from the shelf and a pair of side edges 60a and 60b extending from the top edge to the shelf. The side edges can be rounded as shown in FIGS. 1B, 2B, and 6 and the top edge can also be rounded as shown in FIG. 4A. At its maximum height ($H_O$), the elongated slot opening is less than one quarter the height of the divider wall ($H_{Omax} < \frac{1}{4}H_D$) and the width of the elongated slot opening is less than the width of the divider wall ($W_O < W_D$). Accordingly, to allow a pass through between the shelf sections separated by the divider wall, at least one and preferably both of the opening height and width are respectively less than the divider wall height and width. It will be appreciated that the positioning and sizing of the opening in the divider wall can be changed to allow for easily passing through the cables from the storage compartment to the cubby while also substantially hiding the electrical devices in the storage compartment from view through the cubby at the front of the table and preventing the electrical devices from being pulled into the cubby.

To provide access to the storage compartment for inserting the power strip, the power supplies, the communication hub, and other electronic devices, and for running power cords or communication wires from wall outlets or other electronic devices situated on the tabletop, an open space 44 is provided between the back edge of the shelf and tabletop as particularly shown in FIGS. 1B, 2A, and 3A-3D. Accordingly, the storage compartment and equipment placed therein can be conveniently accessed through the open space in the backside of the table while the cords are routed through the apertures in the groove to the electronic devices sitting on the tabletop and through the opening in the divider wall to the electronic devices that are within the cubby. As explained below with reference to FIGS. 3A-3D, the divider wall can be behind or ahead of the apertures in the tabletop. It will also be appreciated that although the apertures in the tabletop are beneficial for the reasons explained above, they are not necessary. For example, as shown in FIG. 7B, the tabletop could have a notched section 78 along its back edge, and cords from electronic equipment in the storage compartment could be routed around the notched section to electronic devices on the tabletop while other cords from electronic equipment in the storage compartment could be routed through the opening in the divider wall to electronic devices that are within the cubby. The notched section is also beneficial for cables which have a head that is larger than the apertures in the groove, such as power cords and some audio/video cords.

Figures 3A, 3B, 3C:
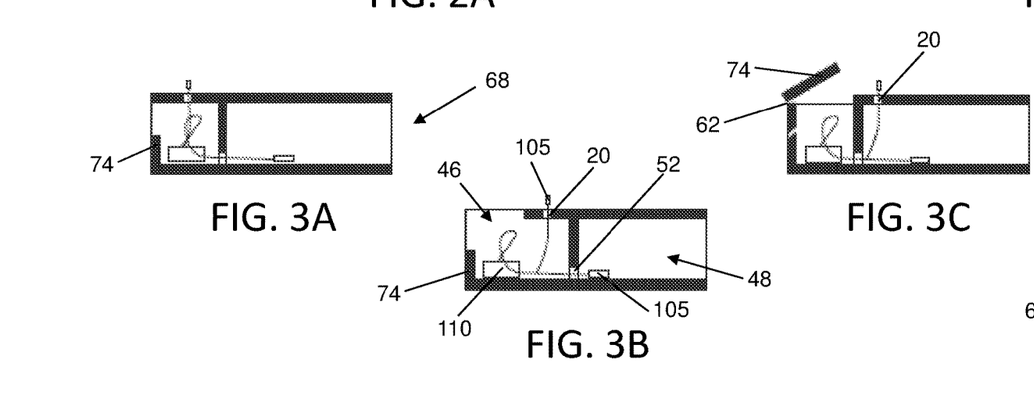
FIGS. 3A-3D show side cross-sectional views of alternative openings and cord passageways in the storage compartment according to the invention described herein.
Figure 3D:
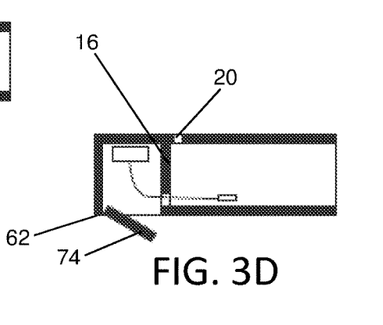

The configuration of the open space to the storage compartment is not intended to be limiting, and FIGS. 3A-3D illustrate various open space configurations to the back storage compartment which has an opening in the divider wall to the front cubby. In some of these configurations, the groove and apertures in the tabletop may be positioned behind the divider wall over the back storage compartment as shown in FIGS. 3A and 3B or ahead of the divider wall, over the front cubby, if the shelf extends ahead of the divider wall, as shown in FIGS. 3C and 3D. As shown in FIGS. 3A and 3B, the open space can be a slot provided in the back wall of the storage compartment between a top edge and the back end of the tabletop. Further, the open space may be enlarged as shown in FIG. 3B with the back end of the tabletop being recessed from the back end of the shelf to allow easier access to the storage compartment from the top of the table. In another embodiment, the open space may open or close with a door positioned above the back section on the tabletop or below the top section in the shelf as respectively shown in FIGS. 3C and 3D. Furthermore, the open space may also be provided on the sides of the shelf or at any other location within at least one of the tabletop, the shelf, between the back edge and the back end, and between the pair of side edges and the pair of side ends, and may also include a door or similar structure. As explained below with reference to FIG. 6, the various tabletop and shelf configurations of the present invention can also be used as a wall shelf 10*c*.

Figure 2A:
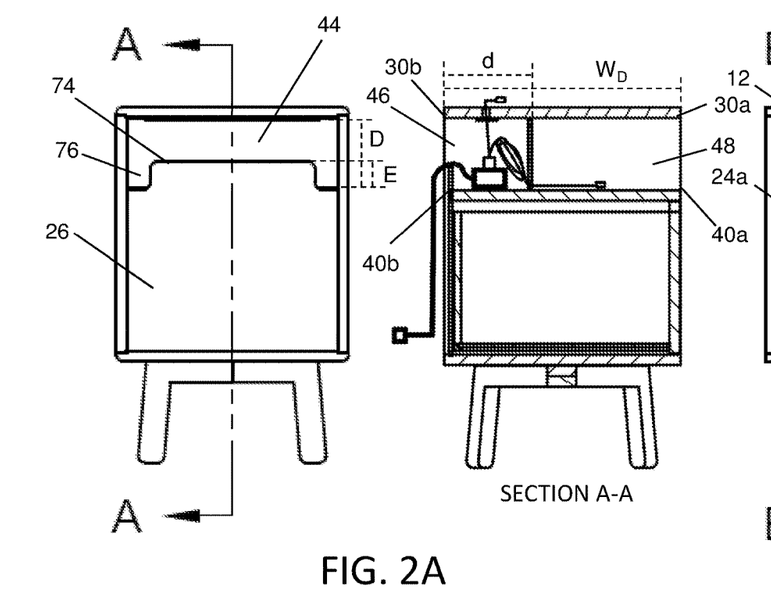
FIGS. 2A and 2B are back and front views, respectively, with corresponding side cross-sectional views of the side table shown in FIGS. 1A and 1B.
Figure 2B:
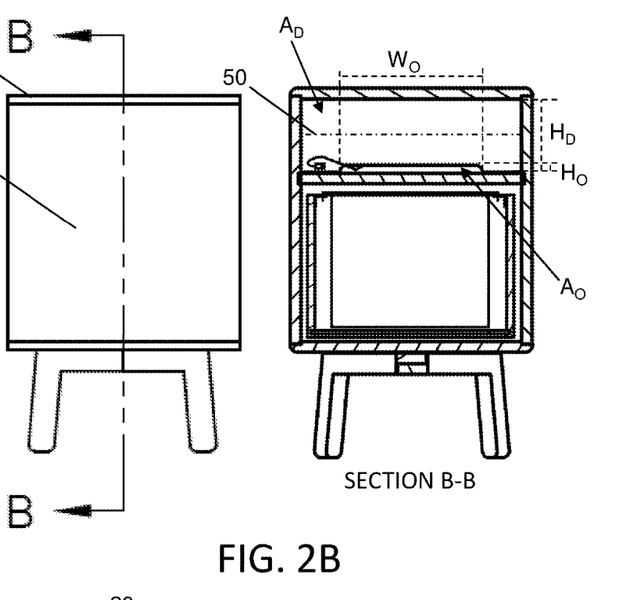
Figure 5:
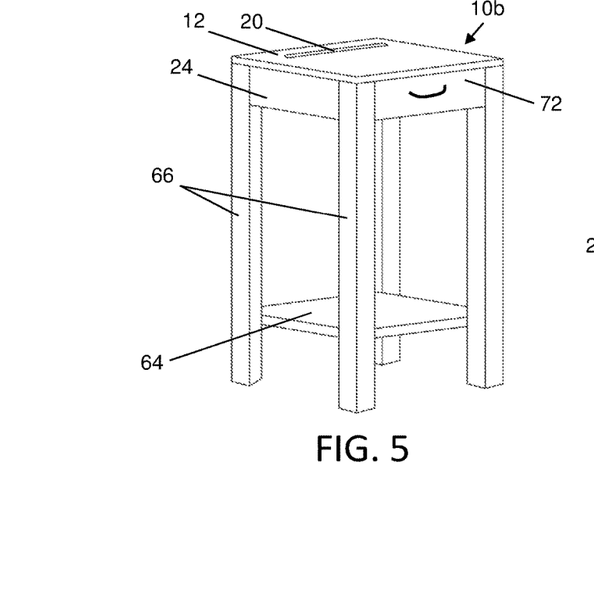
FIG. 5 shows an alternative side table according to the invention described herein.

The side table 10*b* shown in FIGS. 1 and 2 includes a base 18 with a bottom panel 64 and vertical panels that are connected to the bottom panel at its perimeter extend to the shelf and/or to the table top. Two opposing side panels 24*a* and 24*b* connect between the side edges of the bottom panel and the side edges of the tabletop. The interior face of each side panel has a horizontal groove extending between the front and back of the corresponding side panel, and each one of the side ends of the shelf fits into the corresponding groove where they are respectively fastened to the side panel. A back panel 26 connects to the bottom panel and the pair of side panels and extends up to the shelf. The back panel preferably does not reach the bottom side of the tabletop so that an open space remains between the back edge of the shelf and the back edge of the tabletop which allows for the convenient access to the storage compartment. In an alternative embodiment, such as shown and described in the '209 Patent, the back panel's top end can extend all the way to the bottom side of the tabletop, and the back panel's bottom end can be connected to the back end of the shelf with one or more hinges 62 so the back panel's top end can rotate out from the shelf. It will also be appreciated that hinges could alternatively connect the back panel's top end to the back edge of the tabletop in which case the back panel's bottom end would rotate out from the shelf. The cubby has an open front face 68 between the tabletop and the shelf on the front side of the table so that the user can conveniently access the cubby, and a sliding drawer 70 is connected to the base below the shelf and can be opened and closed from the front side of the table. As shown in FIG. 5, a door 72 could be mounted to the table in front of the cubby and can be opened to access the cubby space, or another sliding drawer could be mounted within the cubby.

Although the back panel does not extend all the way to the tabletop so there remains the open space to the storage compartment, a top center portion 74 of the back panel preferably extends to an elevation (E) above the back edge of the shelf as shown in FIGS. 1B, 2A and 3A, and 3B. The top center portion's elevation over the shelf is preferably less than half the height of the divider panel and helps to contain the electronic equipment within the storage compartment, preventing the electronic equipment from falling off the shelf without the need for any fasteners to hold the equipment on the shelf. Additionally, the top center portion's elevation at least partially obstructs the view of the power strips, power supplies, communication hubs, cords, and any other electronic equipment held within the storage compartment while the open space allows for convenient access to the electronic equipment. As particularly shown in FIGS. 1B and 2A, the elevation of the back panel's top center portion does not extend all the way to the side panels which results in cutout sections 76 on each side of the center portion which also allows for channeling the cords between the storage compartment and wall outlets or other power sources that may be on the ground. It is also possible that the back panel's top center portion only extends to the back edge of the shelf and does not have any elevation over the shelf. Additionally, the different open space configurations shown in FIGS. 3A-3D may be incorporated into the side table. Although it is not preferred, it is also possible for the top of the back panel to extend all the way to the tabletop, and a top back section may cutout from one or both of the side panels in the location proximate to the storage compartment, i.e., above the shelf and behind the dividing wall.

The storage compartment along the back edge of the shelf allows a user to quickly and conveniently connect power cables and communication wires to electrical devices that can be sitting on the tabletop, held within the groove, or placed within the cubby while the electrical power equipment and communication hubs remain hidden below the tabletop and behind the divider wall. The storage compartment of the present invention is different from "technology troughs" that are incorporated into other tables and desks, such as disclosed in U.S. Pat. Nos. 6,327,983, 9,124,308 and 9,210,999 and U.S. Pat. App. Pub. Nos. 2003/0070595, 2006/0096506 and 2009/0165680, because it not only has a passageway for the cables to reach electronic devices sitting on the tabletop, it also has the opening in the dividing wall which provides a cable passageway to electronic devices that are within the cubby below the tabletop. Additionally, the storage compartment of the present invention is not limited by any specific equipment, such as some technology troughs that are limited to specific apertures that hold power sources while others hold phone or internet ports; instead, the open configuration of the storage compartment allows for any type of equipment or accessory to be positioned on the shelf or mounted to the underside of the tabletop as shown in FIG. 3D or to the dividing wall (not shown) in any arrangement that the user would like. This open configuration storage compartment allows a user to house any type of electrical power equipment, communication equipment, and similar equipment or accessories rather than those solely designed to fit within previously known technology troughs. Additionally, the opening in the dividing wall between the storage compartment and the cubby combined with the open space at the back of the storage compartment and/or the apertures between the top side of the tabletop and the bottom side of the tabletop provides for cable passageways that connect the equipment in the storage compartment to electronic devices sitting on the tabletop as well as electronic devices that are on the shelf within the cubby below the tabletop.

The base section is preferably supported by legs 66 that preferably connect to the bottom side of the bottom panel and support the table. It will also be appreciated that the base may not necessarily have a base panel, side panels, and back panels between the legs and the shelf and tabletop and could instead have legs that connect to the shelf and/or the tabletop, such as shown in FIGS. 4A, 4B, 5, and 7A. Further, it will be appreciated that the table may have side panels that only extend between the tabletop and the shelf, such as shown in FIGS. 4A and 5. Accordingly, side panels may only connect the sides of the shelf to the sides of the tabletop, and there may be a back panel that projects upward from the back edge of the shelf partially in the space between the shelf and the tabletop, similar to the top center portion of the back panel described above. It will also be appreciated that without departing from the scope of the present invention, the shelf can be suspended from the tabletop, such as with hanging brackets (not shown), rather than being connected to the panels and/or legs.

Figure 4B:
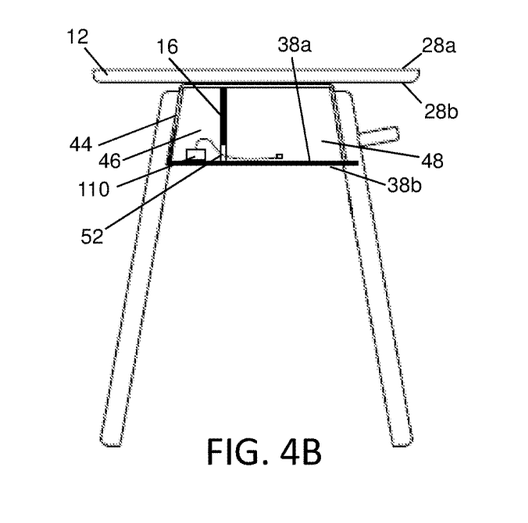

As with the side table described in detail above, the storage compartment and cubby can also be incorporated into a desk 10a as shown in FIGS. 4A, 4B, and 7A. In such an embodiment the shelf is positioned beneath the desktop and is connected thereto by the table's legs at each corner of the shelf, and the divider wall that spans the longitudinal width of the shelf and connects to the underside of the desktop along the top edge of the divider wall. As in the side table embodiment described above, the divider wall includes an opening along the bottom edge to provide the cable passage from the storage compartment to the cubby in addition to the cable passage through the apertures in the groove above either the storage compartment or the cubby. As with the side tables, the storage compartment in the desk has an open space along the back of the table to allow power cords to reach wall outlets proximate to the table. In the side table embodiment shown in FIG. 5, either a door is positioned in front of the cubby's open front or a sliding drawer is secured within the cubby. As shown in FIG. 6, the tabletop and shelf combination described above can be incorporated into a wall shelf in which case the base section may be shelving brackets (not shown) or may be any other structure or fasteners that mount the shelf to a wall, such as screws, anchors, French cleats, rails or any other fastening device. In each embodiment, the divider wall's total area, including the area of the opening in the divider wall, is less than the tabletop's area ($A_D < A_T$).

As explained above, many different types of grooves and apertures in the tabletop can be used for the table of the present invention. Preferably, the length of the longest groove in the tabletop spans a majority of the tabletop's width between the tabletop's side edges, i.e., greater than ½ the width of the tabletop ($L_{Gmax} > \frac{1}{2} W_T$). Although the length, position, and number of grooves may vary between embodiments, the groove provides multiple mounting positions relative to the lateral axis of the table. The longest groove preferably spans across the lateral axis of the table and provides multiple mounting positions within the groove. It is also possible to provide grooves that do not span across the lateral axis of the table with one groove proximate to one side of the table and another groove proximate to the opposite side of the table. Generally, the total length of the groove or grooves is greater than the depth of the tabletop which provides a wide range of mounting options and positions for electronic equipment and other accessories. As the groove and apertures are preferably formed on both sides of the lateral axis, a user may support or anchor any accessory within the groove on both sides of the work top. Similarly, a user may mount multiple accessories within the groove in a variety of locations as the groove is not limited to holding a single device as seen in the prior art.

In addition to providing support for tech products, another particular aspect of the groove is its ability to hold other non tech accessories. Accordingly, the groove itself is designed to support any number of accessories that a user may use on an end table. The series of apertures spaced from one another by a distance ($S_A$) allow wires to pass through the tabletop for tech products like phones, computers, and tablets. When the wired tech product is held within the groove and connected to the wire, the wire head can fit within one of the apertures in the groove's trough. To prevent the wire from falling through the aperture when the tech product is disconnected from the wire, a fastener, such as an anchor or a knot, can be connected to the wire. The apertures preferably have a lateral aperture width ($W_A$) and a longitudinal aperture length ($L_A$). The lateral aperture width is approximately equal to the groove width at the bottom trough and is preferably less than the longitudinal aperture length.

Any type of material can be used to manufacture tables according to the present invention, including but not limited to hardwood, veneer, aluminum, steel, stone, Solid Surface, MDF, powder coated MDF, fiberglass, plastic, glass, concrete, or any other similar building material or combination of materials. Preferably, the material sections used to form the tabletop, shelf, and the base can be packed flat for efficient storage and transportation of the unassembled table structure, and the sections can be easily assembled into the table upon delivery of the packaged material sections.

The embodiments were chosen and described to best explain the principles of the invention and its practical application to persons who are skilled in the art. As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. For example, although a laptop computer is shown in the cubby, it will be appreciated that any type of electronic device that fits within the cubby could be held and powered therein, such as a smart-phone or one or more portable speakers that communicate wirelessly with other electronic devices. Thus, the breadth and scope of the present invention should not be limited by any of the above-described exemplary embodiments, but should be defined only in accordance with the following claims appended hereto and their equivalents.

What is claimed is:

1. A table for securely holding and storing accessories, comprising:
    a tabletop comprising a top surface, a bottom surface, a front edge, a back edge, and a pair of side edges, wherein the tabletop has a first area with a first depth between the front edge and the back edge and a first width between the pair of side edges, wherein the tabletop has a central lateral axis equidistant between the pair of side edges, and wherein the tabletop has a central longitudinal axis equidistant between the front edge and the back edge;

a shelf positioned beneath the tabletop in a substantially horizontal orientation, wherein the shelf comprises an upper surface, a lower surface, a front end, a back end and a pair of side ends, wherein the shelf has a second area that is less than or equal to the first area of the tabletop, wherein the back end of the shelf is aligned with the back edge of the tabletop, and wherein the shelf is spaced from the tabletop by a first distance and forms an open space between the back end of the shelf and the back edge of the tabletop;

a divider wall situated between the bottom surface of the tabletop and the upper surface of the shelf in a substantially vertical orientation, wherein a height of the divider wall spans the first distance between the tabletop and the shelf, wherein a second width of the divider wall is approximately equal to the first width of the tabletop, wherein the divider wall has a longitudinal axis substantially parallel with the central longitudinal axis of the tabletop, wherein the longitudinal axis of the divider wall is spaced forward from the back edge of the tabletop by a second distance equal to or greater than one half the first distance and is located backward from the central longitudinal axis, and wherein the divider wall has an opening with an area less than one-fifth a total area of the divider wall; and a base connected to and supporting the tabletop and the shelf.

2. The table of claim 1, wherein the front end of the shelf extends forward of the divider wall and is substantially aligned with the front edge of the tabletop.

3. The table of claim 2, wherein the opening in the divider wall is an elongated slot situated adjacent to the upper surface of the shelf.

4. The table of claim 1, wherein the tabletop further comprises a groove in the top surface and at least one aperture in the groove, wherein the groove comprises a bottom trough between a pair of sidewalls, and wherein the aperture extends through the tabletop from the top surface to the bottom surface.

5. The table of claim 4, further comprising a plurality of apertures within the groove, wherein the groove extends for a length between a first end and a second end and is situated between the central longitudinal axis and the back edge of the tabletop, wherein each one of the apertures extends from the bottom trough through to the bottom surface of the tabletop, and wherein the bottom trough connects the pair of sidewalls along the length of the groove at the bottom surface of the tabletop between each one of the apertures.

6. The table of claim 5, wherein a first set of the apertures are proximate to the first end in the groove and have a first spacing, wherein a second set of the apertures in the groove are spaced apart from the first set of apertures and are proximate to the second end, wherein each one of the apertures comprises a lateral aperture width and a longitudinal aperture length, wherein the lateral aperture width is less than the longitudinal aperture length, and wherein the lateral aperture width is approximately equal to the groove width at the bottom trough.

7. The table of claim 1, further comprising a pair of side panels and a back panel, wherein the pair of side panels extend between and connect the side edges of the tabletop with the side ends of the shelf, wherein the back panel has a connection to the back end of the shelf and has a top end extending upwards from the back end of the shelf towards the back edge of the tabletop by an elevation, wherein the elevation is less than half the first distance, and wherein at least one of the connection to the back end of the shelf and the elevation above the back end of the shelf respectively is a hinged connection allowing the back panel to rotate out from the shelf.

8. The table of claim 1, wherein the base further comprises a set of legs, and wherein the tabletop is further comprised of a notched section in the back edge.

9. The table of claim 1, wherein the base further comprises a bottom panel, a back panel, and a pair of side panels, wherein the pair of side panels respectively extend between and connect the bottom panel with the side ends of the shelf and the side edges of the tabletop, wherein the back panel extends between and connects the bottom panel and the shelf back end, and wherein a top end of the back panel extends upwards from the shelf towards the back edge of the tabletop to an elevation that is less than half the height of the divider wall.

10. The table of claim 9, further comprising a sliding drawer connected to the base and situated between the pair of side panels.

11. A table for securely holding and storing accessories and accessory supports, comprising:

a tabletop comprising a top surface, a bottom surface, a front edge, a back edge, and a pair of side edges, wherein the tabletop has a first area with a first depth between the front edge and the back edge and a first width between the pair of side edges, wherein the tabletop has a central lateral axis equidistant between the pair of side edges, and wherein the tabletop has a central longitudinal axis equidistant between the front edge and the back edge;

a shelf positioned beneath the tabletop in a substantially horizontal orientation, wherein the shelf comprises an upper surface, a lower surface, a front end, a back end and a pair of side ends, wherein the shelf has a second area that is less than or equal to the first area of the tabletop, wherein the back end of the shelf is aligned with the back edge of the tabletop, wherein the front end of the shelf extends forward of the central longitudinal axis, and wherein the shelf is spaced from the tabletop by a first distance and forms an open space between the back end of the shelf and the back edge of the tabletop;

a divider wall situated between the bottom surface of the tabletop and the upper surface of the shelf in a substantially vertical orientation, wherein a height of the divider wall spans the first distance between the tabletop and the shelf, wherein a second width of the divider wall is approximately equal to the first width of the tabletop, wherein the divider wall has a longitudinal axis substantially parallel with the central longitudinal axis of the tabletop, wherein the longitudinal axis of the divider wall is spaced forward from the back edge of the tabletop by a second distance equal to or greater than one half the first distance and is located backward from the central longitudinal axis, and wherein the divider wall has an opening with an area less than one half a total area of the divider wall; and a base connected to and supporting the tabletop and the shelf.

12. The table of claim 11, further comprising a pair of side panels and a back panel, wherein the pair of side panels extend between and connect the side edges of the tabletop with the side ends of the shelf, wherein the back panel has a connection to the back end of the shelf and has a top end extending upwards from the back end of the shelf towards the back edge of the tabletop by an elevation, wherein the elevation is less than half the first distance, wherein at least one of the connection to the back end of the shelf and the elevation above the back end of the shelf respectively is a hinged connection allowing the back panel to rotate out from the shelf, and wherein the opening is an elongated slot situated immediately adjacent to at least one of the upper surface of the shelf, the bottom surface of the tabletop and one of a pair of opposing divider wall ends.

13. The table of claim 11, wherein the area of the opening is less than one-fifth the total area of the divider wall.

14. The table of claim 11, wherein the tabletop further comprises a groove in the top surface having a bottom trough between a pair of sidewalls and a plurality of apertures within the groove, wherein the groove extends for a length between a first end and a second end and is situated between the central longitudinal axis and the back edge of the tabletop, wherein each one of the apertures extends from the bottom trough through to the bottom surface of the tabletop, and wherein the bottom trough connects the pair of sidewalls along the length of the groove at the bottom surface of the tabletop between each one of the apertures.

15. The tabletop of claim 14, wherein the groove is comprised of a slot in the tabletop and a slot bracket mounted to the tabletop, wherein the slot bracket forms the bottom trough of the groove and connects the pair of sidewalls, wherein the slot extends the thickness of the tabletop from the top surface to the bottom surface, and wherein the apertures are formed in the slot bracket.

16. A table for securely holding and storing accessories, comprising:
  a tabletop comprising a top surface, a bottom surface, a front edge, a back edge, and a pair of side edges, wherein the tabletop further comprises a groove in the top surface and at least one aperture in the groove, wherein the groove comprises a bottom trough between a pair of sidewalls, wherein the aperture extends through the tabletop from the top surface to the bottom surface, wherein the tabletop has a first area with a first depth between the front edge and the back edge and a first width between the pair of side edges, wherein the tabletop has a central lateral axis equidistant between the pair of side edges, and wherein the tabletop has a central longitudinal axis equidistant between the front edge and the back edge;
  a shelf positioned beneath the tabletop in a substantially horizontal orientation, wherein the shelf comprises an upper surface, a lower surface, a front end, a back end and a pair of side ends, wherein the shelf has a second area that is less than or equal to the first area of the tabletop, wherein the back end of the shelf is aligned with the back edge of the tabletop, and wherein the shelf is spaced from the tabletop by a first distance and forms an open space between the back end of the shelf and the back edge of the tabletop; and
  a divider wall situated between the bottom surface of the tabletop and the upper surface of the shelf in a substantially vertical orientation, wherein a height of the divider wall spans the first distance between the tabletop and the shelf, wherein a second width of the divider wall is approximately equal to the first width of the tabletop, wherein the divider wall has a longitudinal axis substantially parallel with the central longitudinal axis of the tabletop, wherein the longitudinal axis of the divider wall is spaced forward from the back edge of the tabletop by a second distance equal to or greater than one half the first distance and is located backward from the central longitudinal axis, and wherein the divider wall has an opening with an area less than one-fifth a total area of the divider wall.

17. The table of claim 16, wherein the front end of the shelf extends forward of the central longitudinal axis, and wherein the opening in the divider wall is an elongated slot situated adjacent to the upper surface of the shelf.

18. The table of claim 16, further comprising a back panel, wherein the back panel has a connection to the back end of the shelf and has a top end extending upwards from the back end of the shelf towards the back edge of the tabletop by an elevation, wherein the elevation is less than half the first distance, and wherein at least one of the connection to the back end of the shelf and the elevation above the back end of the shelf respectively is a hinged connection allowing the back panel to rotate out from the shelf.

19. The table of claim 16, further comprising a base connected to and supporting the tabletop and the shelf and a plurality of apertures within the groove, wherein the base is further comprised of a set of legs, wherein the groove extends for a length between a first end and a second end and is situated between the central longitudinal axis and the back edge of the tabletop, wherein each one of the apertures extends from the bottom trough through to the bottom surface of the tabletop, and wherein the bottom trough connects the pair of sidewalls along the length of the groove at the bottom surface of the tabletop between each one of the apertures.

20. The table of claim 19, wherein each one of the apertures comprises a lateral aperture width and a longitudinal aperture length, and wherein the lateral aperture width is approximately equal to the groove width at the bottom trough.

* * * * *